(12) United States Patent
Speed et al.

(10) Patent No.: US 11,119,397 B2
(45) Date of Patent: Sep. 14, 2021

(54) DIAGNOSTIC CAMERA APPARATUS AND METHOD FOR INSPECTION OF AN ENCLOSED TUBE SYSTEM

(71) Applicant: CANON VIRGINIA, INC., Newport News, VA (US)

(72) Inventors: Alan-James Speed, Newport News, VA (US); David Li, Newport News, VA (US); Ray Dawson, Newport News, VA (US); Ralph C. McCann, III, Williamsburg, VA (US); Makoto Ogusu, Yorktown, VA (US); James Pulverenti, Williamsburg, VA (US); Paxton O'Toole, Norfolk, VA (US)

(73) Assignee: Canon Virginia, Inc., Newport News, VA (US)

( * ) Notice: Subject to any disclaimer, the term of this patent is extended or adjusted under 35 U.S.C. 154(b) by 91 days.

(21) Appl. No.: 15/835,282

(22) Filed: Dec. 7, 2017

(65) Prior Publication Data
US 2018/0164673 A1    Jun. 14, 2018

Related U.S. Application Data

(60) Provisional application No. 62/431,658, filed on Dec. 8, 2016.

(51) Int. Cl.
*H04N 5/225*    (2006.01)
*G03B 37/00*    (2021.01)
(Continued)

(52) U.S. Cl.
CPC ............ *G03B 37/005* (2013.01); *F16L 55/26* (2013.01); *F16L 55/30* (2013.01); *H04N 5/2252* (2013.01);
(Continued)

(58) Field of Classification Search
CPC .................. F16L 2101/30; F16L 55/26; G03B 2215/0503; G03B 37/005;
(Continued)

(56) References Cited

U.S. PATENT DOCUMENTS

| 4,677,472 A | 6/1987 | Wood |
| 6,554,765 B1 * | 4/2003 | Yarush ............... A61B 1/00039 |
| | | 348/73 |

(Continued)

FOREIGN PATENT DOCUMENTS

| KR | 100942413 B1 | 2/2010 |
| KR | 101062005 B1 | 9/2011 |

OTHER PUBLICATIONS

Caitlyn Dawson; The robot that dects underground water leaks; Dec. 8, 2017; University of Southern California; phys.org pp. 1-3.

(Continued)

*Primary Examiner* — Md N Haque
(74) *Attorney, Agent, or Firm* — Canon U.S.A., Inc, IP Division

(57) ABSTRACT

The present disclosure relates in general to a diagnostic device for inspection of an enclosed tube system, and more particular, to obtain images or video of the interior of the enclosed tube system while the diagnostic device is attached to a moveable member and traveling through the enclosed tube system. A diagnostic apparatus including camera housing configured to include a camera assembly, battery housing configured to hold a battery assembly, and a main housing configured to be detachably secured to a moveable member, wherein the camera housing and battery assembly are secured to the main housing, and wherein the main housing includes at least one light.

20 Claims, 8 Drawing Sheets

(51) Int. Cl.
  *F16L 55/26* (2006.01)
  *F16L 55/30* (2006.01)
  *F16L 101/30* (2006.01)

(52) U.S. Cl.
  CPC ......... *H04N 5/2256* (2013.01); *H04N 5/2257* (2013.01); *F16L 2101/30* (2013.01); *G03B 2215/0503* (2013.01); *H04N 2005/2255* (2013.01)

(58) Field of Classification Search
  CPC ......... H04N 2005/2255; H04N 5/2252; H04N 5/2256; H04N 5/2257
  See application file for complete search history.

(56) References Cited

U.S. PATENT DOCUMENTS

| | | | |
|---|---|---|---|
| 7,164,476 B2 | 1/2007 | Shima et al. | |
| 7,551,197 B2 | 6/2009 | Penza et al. | |
| 8,018,486 B2 | 9/2011 | Hinn | |
| 8,345,094 B2 | 1/2013 | Demers et al. | |
| 8,395,661 B1 | 3/2013 | Olsson et al. | |
| 8,547,428 B1 | 10/2013 | Olsson et al. | |
| 8,970,211 B1* | 3/2015 | Olsson | G01D 5/145 324/220 |
| 9,041,794 B1 | 5/2015 | Olsson et al. | |
| 9,134,255 B1 | 9/2015 | Olsson et al. | |
| 9,206,938 B2 | 12/2015 | Thursby | |
| 9,328,858 B2 | 5/2016 | Penza | |
| 9,824,433 B2 | 11/2017 | Olsson et al. | |
| 2006/0017930 A1* | 1/2006 | Canty | G01N 21/8507 356/436 |
| 2014/0009598 A1 | 1/2014 | ODonnell et al. | |
| 2014/0111634 A1* | 4/2014 | Mueckl | H04N 5/2252 348/82 |
| 2014/0333753 A1 | 11/2014 | Chapman | |
| 2016/0025653 A1* | 1/2016 | Jalilian | G01N 21/954 356/241.1 |
| 2016/0139061 A1 | 5/2016 | Kesselberg | |
| 2016/0223120 A1* | 8/2016 | Gagliardo | F16L 55/162 |
| 2016/0353065 A1 | 12/2016 | Nicholson | |

OTHER PUBLICATIONS

"Video Camera & Conveyor Monitoring System—Inspection Camera for Conveyor Monitoring System" Online video clip [19 seconds] (pp. 1-5 information, in addition to 6 pages of video frames at 2,3,4,5,6, and 7 intervals); cablevey.com/conveyor-monitoring-system-cameras.

* cited by examiner

DIAGNOSTIC CAMERA APPARATUS AND METHOD FOR INSPECTION OF AN ENCLOSED TUBE SYSTEM

CROSS-REFERENCE TO RELATED APPLICATIONS

The present application is a Non-Provisional application which claims priority to Provisional Patent Application No. 62/431,658, filed Dec. 8, 2016, entitled "PIPE INSPECTION CAMERA MODULE", the disclosure of which is incorporated herein by reference in its entirety.

BACKGROUND

Field of the Disclosure

The present disclosure relates in general to a diagnostic device for inspection of an enclosed tube system, and more particular, capability to obtain images or video of the interior of the enclosed tube system while a diagnostic camera apparatus is attached to a moveable member and traveling through the enclosed tube system.

Description of the Related Art

Inspecting an enclosed tube system with a camera is a useful technology. The use of a camera for inspection allows its user to identify potential or actual problems within the interior of the system. Occasionally, there will be a problem in the system that causes the system not to work properly, and a repair will need to be made quickly to prevent downtime. As such, a camera for inspection allows direct identification of debris or system defects, as well as the location of the debris or defects in the system.

Currently, obtaining such information from the enclosed tube system requires that a generic low-cost camera is attached to a cable and fed through an enclosed tube system. However, there are issues when using this technique. One issue is the cameras utilized in such inspections do not provide adequate frame rate relative to the speed of movement of the camera. Also, cameras utilized in such inspections do not provide clear imaging of the interior of the enclosure due to the poor quality of the captured images. Another issue is that the light used by the camera to illuminate the enclosure is a single un-diffused illumination light-emitting diode (LED), which does not provide consistent illumination and contributes to the difficulty in providing clear images of the enclosure tube interior for debris location identification or enclosure tube defect recognition. Another issue is that current cameras utilize small size coin cell batteries and the camera run time is limited. These batteries are also difficult to replace because they are soldered or insecurely clipped in place. Another issue is that the cameras utilized in such inspections are secured using multiple parts, fasteners, and a tool, meaning that switching the unit to another enclosed tube system is time-consuming and cumbersome. Finally, the cameras utilized in such inspections build up internal heat during operation, initiating thermal shut down until the camera is able to be cooled, which severely limits the runtime and therefore the number of images captured.

Accordingly, there is a need for a diagnostic camera apparatus to help diagnose problems in an enclosed tube system that provides high-quality images, proper illumination, long battery life, easy installation and removal process, and defense against building up internal heat during operation.

SUMMARY

Disclosed herein are systems, methods and devices for a diagnostic device for inspection of an enclosed tube system, and more particular, capability to obtain images or video of the interior of the enclosed tube system while a diagnostic camera apparatus is attached to a moveable member and traveling through the enclosed tube system.

One aspect includes a diagnostic apparatus including, a camera housing configured to include a camera assembly, a battery housing configured to hold a battery assembly, and a main housing configured to be detachably secured to a moveable member, where the camera housing and battery assembly are secured to the main housing, and where the main housing includes at least one light.

Another general aspect includes a method of diagnostic inspection of an enclosed tube system, the method including, attaching a diagnostic apparatus to a moveable member of the enclosed tube system. The method of diagnostic inspection also includes moving the diagnostic apparatus through the enclosed tube system. The method of diagnostic inspection also includes capturing images or video of an interior of the enclosed tube system. The method of diagnostic inspection also includes where the diagnostic apparatus includes a camera housing configured to include a camera assembly, a battery housing configured to hold a battery assembly, and a main housing configured to be detachably secured to a moveable member, where the camera housing and battery assembly are secured to the main housing, and where the main housing includes at least one light.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein.

DETAILED DESCRIPTION

One aspect of this disclosure relates in general to a diagnostic device for inspection of an enclosed tube system, and more particular, to obtain images or video of the interior of the enclosed tube system while a diagnostic camera apparatus is attached to a moveable member and traveling through the enclosed tube system.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when stated explicitly or when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

Figure 1:
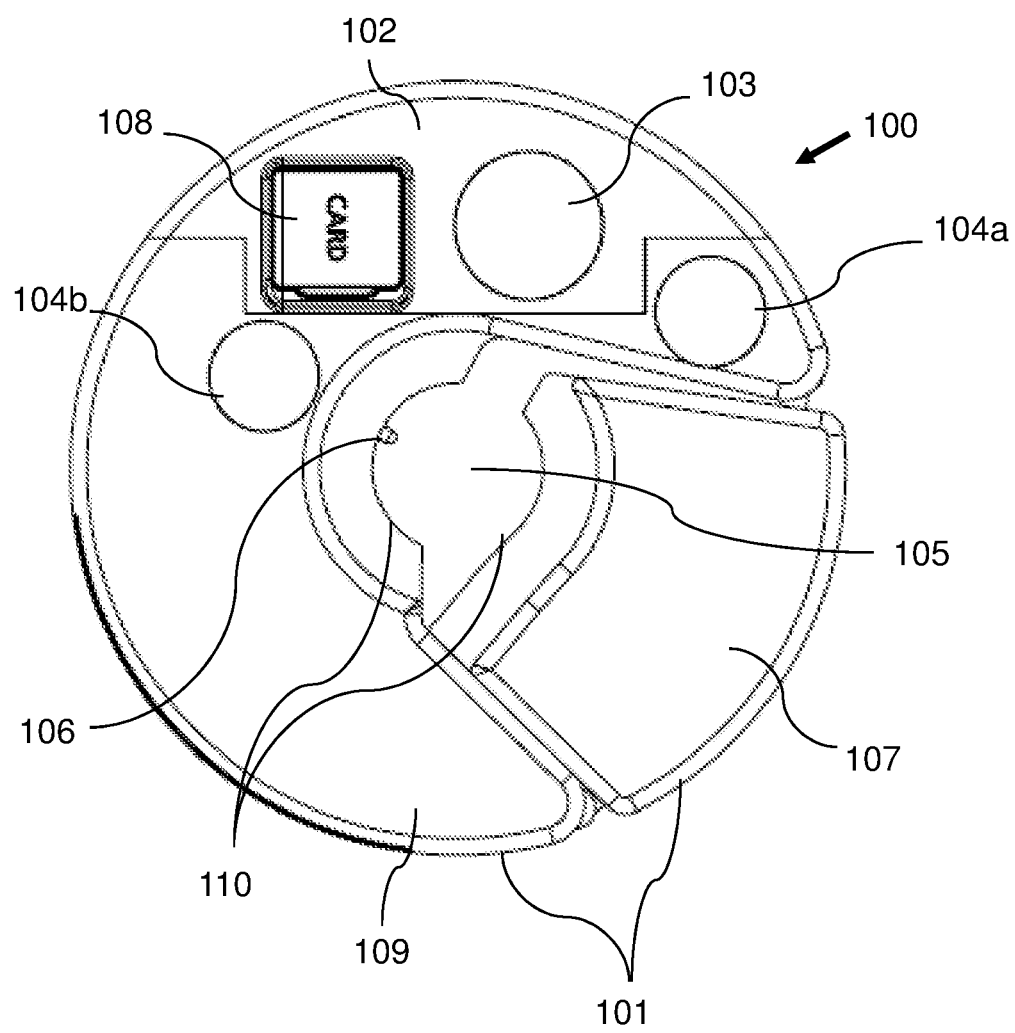
FIG. 1 depicts a frontal graphical representation of a diagnostic apparatus according to one or more aspects of the present disclosure.

Referring now to the figures, FIG. 1 depicts a frontal graphical representation of a diagnostic apparatus according to one or more aspects of the present disclosure. Diagnostic camera apparatus 100 can be configured for inspection of an enclosed tube system, and more particularly, to obtain images or video of the interior of the enclosed tube system while the diagnostic camera apparatus 100 is attached to a moveable member 801 (FIG. 8A-8B) and traveling through the enclosed tube system. By way of example, diagnostic camera apparatus 100 includes a main housing 101 and a camera housing 102.

Main housing 101 can be designed to accommodate an assortment of enclosed tube systems. For example, the main housing 101 can be circular or another shape to accommodate different enclosed tube shape, size, or length. In another aspect of the present disclosure main housing 101 can be configured to accommodate a complex enclosed tube system with multiple bends within the enclosed tube system.

Main housing 101 can include a main housing body 109 and a main housing door 107. Main housing 101 is a structure with main housing body 109 and main housing door 107 that forms a channel 105 that can be secured around a moveable member 801. The main housing door 107 can be opened to allow the moveable member 801 to be inserted into the channel 105 of diagnostic camera apparatus 100. The main housing door 107 can then be closed around moveable member 801 to secure it in channel 105. The moveable member 801 can be secured against an inner wall 110 that surrounds channel 105 as main housing body 109 and main housing door 107 are enclosed around the moveable member 801. In one aspect, inner wall 110 can be of a structural design to secure the moveable member 801 tightly against the inner wall 110 that surrounds channel 105 to prevent the moveable member 801 from slipping during operation. In another aspect, the inner wall 110 can be smooth material, elastomeric material, or rough material depending on how secure the diagnostic camera apparatus 100 needs to be secured to the moveable member 801. In another aspect, inner wall 110 can be designed to be a variety of shapes with multiple inner wall 110 surfaces to accommodate a variety of moveable members 801. For example, an elastomeric material can provide a range of pressure to keep diagnostic camera apparatus 100 from rotating on moveable member 801 or the inner wall 110 can be designed to mirror the design of a coupler 802 (FIG. 8B) which is attached to moveable member 801. In one aspect, a moveable member 801 can be a cable, chain, rope, flexible device, or combination thereof that can travel through an enclosed tube system. In another aspect, a moveable member 801 can be a coupler 802 or other device which is attached to a cable or chain that can travel through an enclosed tube system. Also, main housing 101 will be secured to the moveable member 801 in such a way as to not rotate with respect to the moveable member 801. In another aspect, main housing 101 can mirror the shape of the moveable member 801 so that camera lens 202 (FIG. 2) axis is determined in respect to a moveable member 801 to center the camera lens 202 on the enclosed tube system's center axis for better imaging.

Main housing 101 can also include a detector 106 within the inner wall 110. In one aspect, a detector 106 can be depressed when a moveable member 801 is secured against the inner wall 110. When the detector 106 is depressed by the moveable member 801, it can activate the power to lights of main housing 101. In another aspect, detector 106 can be a sensor to sense contact of a moveable member 801 to the inner wall. In another aspect, detector 106 can be a plunger, magnetic, optical, inductive, or capacitive device to sense contact of a moveable member 801 to the inner wall. In another aspect, detector 106 can also be depressed manually to allow a user to confirm main housing 101 has adequate power or the lights are operating properly before installation on moveable member 801. In another aspect, detector 106 and related main housing 101 is designed to seal around the detector 106 plunger to reduce the possibility of any residual material within the enclosed tube system from entering the interior of the main housing 101. This material could potentially contaminate the diagnostic camera apparatus 100 for a future diagnostic inspection with diagnostic camera apparatus 100. For example, allergen in one enclosed tube system may contaminate another enclosed tube system if the allergen were to enter the interior of the main housing 101. In another aspect, main housing 101 and camera housing 102 of diagnostic camera apparatus 100 is constructed of Food and Drug Administration (FDA) compliant material for use in an assortment of environments including food contact. In another aspect, if detector 106 is a non-contact sensor, magnetic, capacitive, or a combination thereof, there is no need to have a hole for detector 106 because diagnostic camera apparatus 100 is constructed of FDA compliant material which will cover detector 106.

Main housing 101 can also include a plurality of lights. In one aspect, the lights can be included on main housing body 109 to illuminate the enclosed tube system during operation of diagnostic camera apparatus 100. In another aspect, the lights can be included on main housing body 109, main housing door 107, or the combination thereof to increase proper illumination of the enclosed tube system with minimal to no shadows while capturing images or video. In one aspect, lights can be on the same hemisphere vertically as the camera to block or minimize viewable shadows of a moveable member 801 during operation. In one aspect, the light can be LED 104a, LED 104b, or a combination thereof which can have a LED window 214 covering LEDs 104a-104b for protection from debris in enclosed tube system. In another aspect, additional LEDs can be used with LED 104a and LED 104b to illuminate a larger diameter enclosed tube system. In another aspect, additional LEDs can be at positions or angles to illuminate a larger diameter enclosed tube system. In another aspect, a lensing or collimators design of LED 104a and LED 104b can be used to illuminate a larger diameter enclosed tube system. In another aspect, LED 104a and LED 104b can also be diffused LEDs for illumination of the interior of the enclosed tube system or conveyor system In another aspect of the diagnostic camera apparatus 100, camera housing 102 can be secured to main housing 101. In one aspect, camera housing 102 can be detached from main housing 101 to be repaired or serviced. In another aspect, camera housing 102 also includes a lens cover 103. The lens cover 103 provides protection to the camera lens within the camera housing 102. In one aspect, lens cover 103 is positioned on camera housing 102 to protect the camera from debris as LED 104a-104b illuminate the enclosed tube system while capturing images or video. In another aspect, camera housing 102 can include a storage medium access door 108. The storage medium access door 108 can be used to access a storage medium within camera housing 102. In one aspect, the storage medium can be secured to a camera assembly 201 or be removable through the storage medium access door 108. In another aspect, camera housing 102 can include a connector door which can be used to access the camera assembly 201 (shown in FIG. 2) to transfer data between the camera assembly 201 and an external device. In one or more aspects, the connector associated with the camera assembly 201 can be a Universal Serial Bus (USB), High Definition Multimedia Interface (HDMI), Ethernet, or the like to transfer data to and from the camera assembly 201 and an external device.

In another aspect, camera assembly 201 can include a communication device with a transceiver to receive and transmit signals wirelessly to an external device. In another aspect, the communication device can accommodate wireless communication to transfer obtained images or video during a diagnostic inspection of the enclosed tube system with an external device. In another aspect, camera assembly 201 can receive a signal from an external device to activate diagnostic camera apparatus 100 or initiate capturing images or video wirelessly. Wireless communication of diagnostic camera apparatus 100 has a significant benefit of integration with the standard lock-out/tag-out practice in relation to personnel access to the enclosed tube system or conveyor system. Lock-out/tag-out procedures may be a lengthy process. In one aspect, lock-out/tag-out procedures could be started, then the diagnostic camera apparatus 100 installed in enclosed tube system or conveyor system, and then lock-out/tag-out procedures are completed. At this point, an external device can be used to communicate with diagnostic camera apparatus 100 to activate operation wirelessly. A benefit is that the captured images or video length and battery power is conserved by only capturing video when the conveyor is moving, not recording when there is no conveyor motion during lock-out/tag-out procedures. In another aspect, sensors on the camera assembly 210 could detect motion of conveyor and automatically turn on LED 104a and LED 104b and activate operation of the diagnostic camera apparatus 100. A benefit is that the image capture operation would be simplified for the users.

Figure 2:
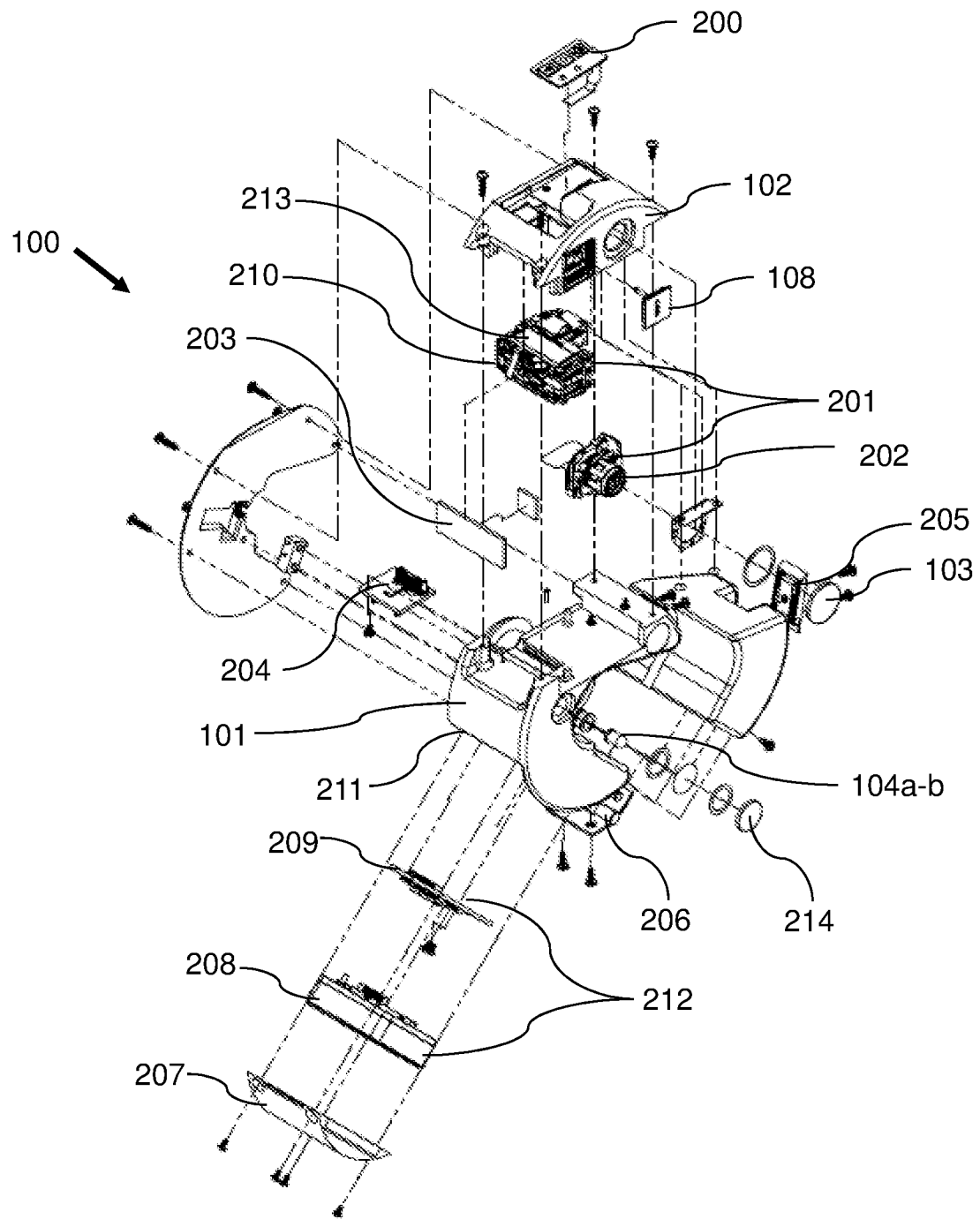
FIG. 2 depicts an exploded graphical representation of a diagnostic apparatus according to one or more aspects of the present disclosure.

FIG. 2 depicts an exploded graphical representation of a diagnostic apparatus according to one or more aspects of the present disclosure. In one aspect, camera housing 102 holds a camera assembly 201. The camera assembly 201 can include camera lens 202 and a camera assembly body 210. The camera lens 202 is configured to be directed towards the exterior through the sealed lens cover 103 of camera housing 102. In one aspect, camera lens 202 can include multiple lenses and complementary metal-oxide-semiconductor (CMOS) subassembly. The camera lens 202 is connected to the camera assembly body 210 with a flexible circuit. The flexible circuit allows for the camera lens 202 and the camera assembly body 210 to be positioned within the camera assembly 201 to save space and provide optimal operation while capturing images or video of an enclosed tube system. Camera assembly 201 is configured to provide a faster frame rate when capturing images or video of an enclosed tube system. A faster frame rate of camera assembly 201 allows faster speed while diagnostic camera apparatus 100 is traveling through enclosed tube system without missing images or video and reducing overall inspection time. Also, the faster frame rate can allow for more images and video to be captured at a given speed for more accurate debris or enclosed tube system defect recognition with a higher number of frames per distance traveled. Finally, a better quality image allows for smaller debris or enclosed tube system defect to be detected.

In another aspect, camera assembly 201 can include a camera circuit 204. The camera circuit 204 provides an interface for operation with the camera assembly 201, main housing 101 and a battery assembly 212. In one aspect, the camera assembly 201 can provide an operation signal to the camera circuit 204 and the camera circuit 204 distributes the signal to the battery assembly 212 or main housing 101. In one aspect, the signal from the camera assembly 201 can initiate power to the LEDs 104a-104b to illuminate and enclosed tube system. In another aspect, the signal from the camera assembly can activate or deactivate the power supply from the battery to camera assembly 201. In another aspect, camera assembly 201 can include a heat sink 203. The heat sink 203 can be secured to camera assembly 201 to remove and dissipate heat from camera assembly body 210 which can produce a majority of the heat source, camera lens 202 which can produce some of the heat sources, and camera circuit 204 which can produce a small amount of the heat source during operation. The heat sink 203 can be a type of material to remove heat such as an aluminium alloy, copper, or the like. In another aspect heat sink 203 can also be secured to other aspects of the diagnostic camera apparatus 100 such as the main housing 101. However, heat sink 203 is not limited to only being secured to camera assembly 201 or main housing 101 to remove heat from diagnostic camera apparatus 100 during operation.

In another aspect, camera housing 102 can include a membrane panel 200. The membrane panel 200 can include a plurality of operation buttons 301 (FIG. 3), and when operation buttons 301 are depressed they operate the camera assembly 201. The membrane panel 200 can include a plurality of operation lights 500a-500b (FIG. 5) to signal to a user if specific functions of diagnostic camera apparatus 100 are operating or not.

In another aspect, camera assembly 201 can include display 213 which is displayed through the display window 300 (FIG. 3) of camera housing 102. Display 213 can display information regarding the diagnostic camera apparatus 100 during operation such as battery power, available memory, LED status, and current operational settings. In another aspect, display 213 can be used in viewing settings and options when operating operation button 301 of the membrane panel 200 are depressed to operate camera assembly 201. In another aspect, a simple user interface can be implemented for user operation. For example, camera settings can be hard-coded into diagnostic camera apparatus 100 for easy user operation such as push button once, LED's turn on, and the camera starts recording, then push the button again, LED's turn off and video recording stops.

In another aspect, main housing 101 of diagnostic camera apparatus 100 includes main housing body 109 that is attached to main housing door 107 by a hinge 206. In another aspect, hinge 206 can also be a pivot joint. In another aspect, hinge 206 can be molded into main housing body 109 and main housing door 107 and joined by a pin. The hinge 206 allows for main housing door 107 to open or swing outwards away from the main housing body 109 to allow a moveable member 801 to be inserted into channel 105. After a moveable member 801 has been inserted into channel 105, main housing door 107 rotates closed by the hinge 206 where main housing door 107 is resting against main housing body 109 again. A fastener 205 is attached to the main housing door 107 on the opposite side of the main housing door 107 from the hinge 206. At this point the fastener 205 can be secured to main housing body 109 on the opposite side on the main housing body 109 from the hinge 206 with a receiving device to secure the main housing body 109 and main housing door 107 together. As a result, moveable member 801 is tightly secured against inner wall 110 to provide a proper inspection position of the diagnostic camera apparatus 100. Diagnostic camera apparatus 100 is now properly installed on a moveable member 801 of an enclosed tube system for diagnostic inspection. Upon completion of the diagnostic inspection, diagnostic camera apparatus 100 can be removed from moveable member 801 in a similar method as it was secured to the moveable member 801 for inspection. In one aspect, fastener 205 can be molded into main housing body 109 and main housing door 107 to secure the main housing body 109 and main housing door 107 together. In another aspect, fastener 205 can be a latch clamp, pin, magnetic mechanism, Velcro, set screws, or a combination thereof to secure the main housing body 109 and main housing door 107 together.

Diagnostic camera apparatus 100 can also include a battery housing 211 integrated into main housing 101. In one aspect, the battery housing 211 can be an open cavity of the main housing 101 and can be covered by a battery access door 207. In one aspect, the battery access door 207 closes over the cavity of the battery housing 211 of the main housing 101 to prevent contaminants or debris from entering the battery housing 211. In another aspect, the battery access door 207 can be secured to main housing 101 by a hinge where the battery access door 207 can swing outward away from main housing 101. In another aspect, the hinge of the battery access door 207 can be molded into the main housing 101 and the battery access door 207 and joined by a pin. In one aspect, the battery housing 211 can be detached from main housing 101 to be repaired or serviced. In one aspect, the battery housing 211 can be configured to hold the battery assembly 212. The battery assembly 212 is configured to include a battery 208 and a battery circuit 209. In one aspect, the battery housing 211 can hold the battery assembly 212. Battery access door 207 to cover the battery housing 211 can be removed from main housing 101 to be easily replaced, repair, or service the battery 208. The battery 208 can be a large alkaline battery, lithium-ion battery, or similar to provide power to diagnostic camera apparatus 100. In one aspect, the battery 208 can provide at least 60 minutes of operational run time during a diagnostic inspection of an enclosed tube system. The battery circuit 209 provides an interface for operation with the camera assembly 201 and main housing 101. In one aspect, the battery 208 is connected to the battery circuit 209 to provide power from the battery 208 to camera circuit 204 then to camera assembly 201. The battery 208 is connected to the battery circuit 209 to provide power from the battery 208 to main housing 101 LED's 104a-104b. In another aspect, power from the battery 208 could be provided to the battery circuit 209, and then to the main housing 101 LED's 104a-104b.

Figure 3:
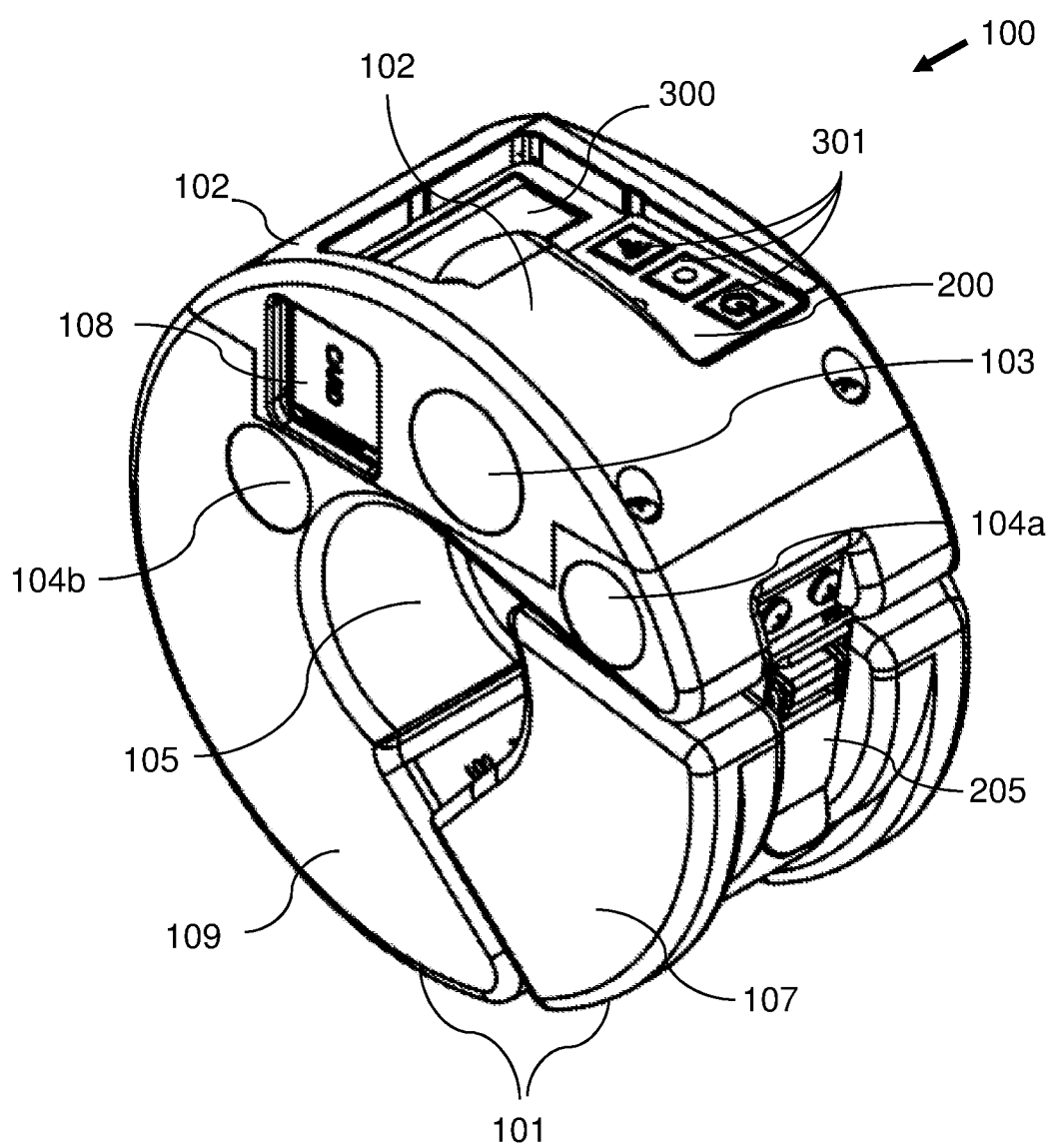
FIG. 3 depicts a perspective graphical representation of a diagnostic apparatus according to one or more aspects of the present disclosure.

FIG. 3 depicts a perspective graphical representation of a diagnostic apparatus according to one or more aspects of the present disclosure. As discussed above, the diagnostic camera apparatus 100 includes a main housing 101 and a camera housing 102.

Camera housing 102 can include a membrane panel 200 and a display window 300. The display window 300 is a sealed viewing window to allow viewing of display 213 of camera assembly 201. The display window 300 also is used to prevent contaminants from entering the interior of the camera housing 102. Display 213 can display information regarding the diagnostic camera apparatus 100 during operation such as battery power, available memory, LED status, and current operational settings or errors through the display window 300. In another aspect, display 213 and display window 300 can be used in viewing settings and options when operating operation button 301 of membrane panel 200 are depressed to operate camera assembly 201.

Figure 4:
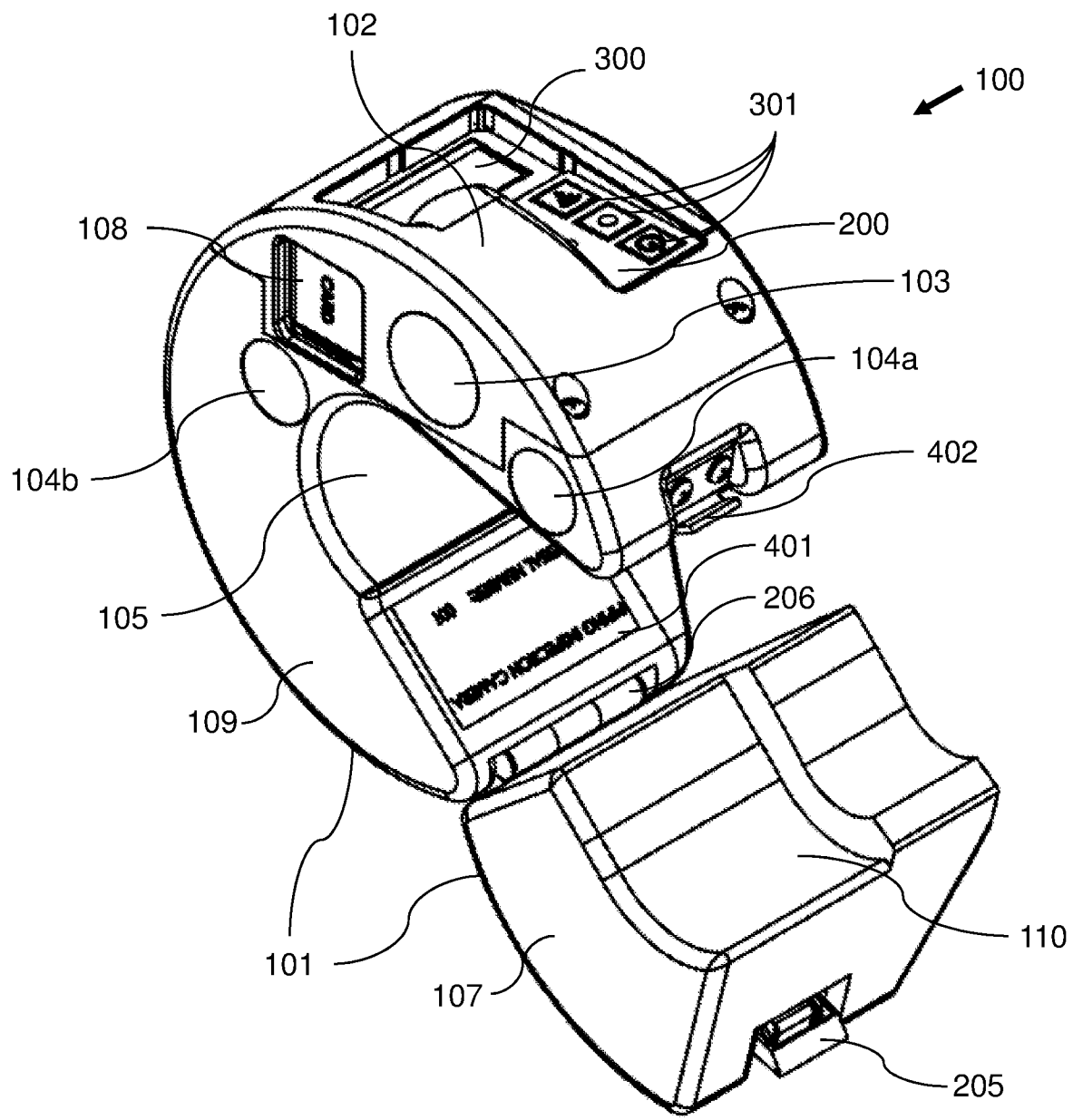
FIG. 4 depicts a perspective graphical representation of a diagnostic apparatus according to one or more aspects of the present disclosure.

FIG. 4 depicts a perspective graphical representation of a diagnostic apparatus according to one or more aspects of the present disclosure. As discussed above, the diagnostic camera apparatus 100 includes a main housing 101 and a camera housing 102.

Main housing 101 of the diagnostic camera apparatus 100 includes main housing body 109 that is attached to main housing door 107 by a hinge 206. In one aspect, main housing body 109 can include a label 401 which can specify information about the diagnostic camera apparatus 100 or even the model number, hardware number, serial number, or the like.

A fastener 205 is attached to the main housing door 107 on the opposite side of the main housing door 107 from the hinge 206. At this point, the fastener 205 can be secured to main housing body 109 on the opposite side on the main housing body 109 from the hinge 206 with a receiving device 402 to secure the main housing body 109 and main housing door 107 together. As a result, moveable member 801 is tightly secured against inner wall 110.

In one aspect, inner wall 110 can be on the same plane from the front of the device to the back of the device. In another aspect, inner wall 110 can have a different diameter or shape depending on the type of movable member. For example, inner wall 110 can be configured to fit a coupler 802 on a moveable member 801 in a conveyor system. However, inner wall 110 of the main housing is not limited to only fitting couplers and can be applied to a moveable member 801 such as a cable, chain, rope, flexible device, or combination thereof.

Figure 5:
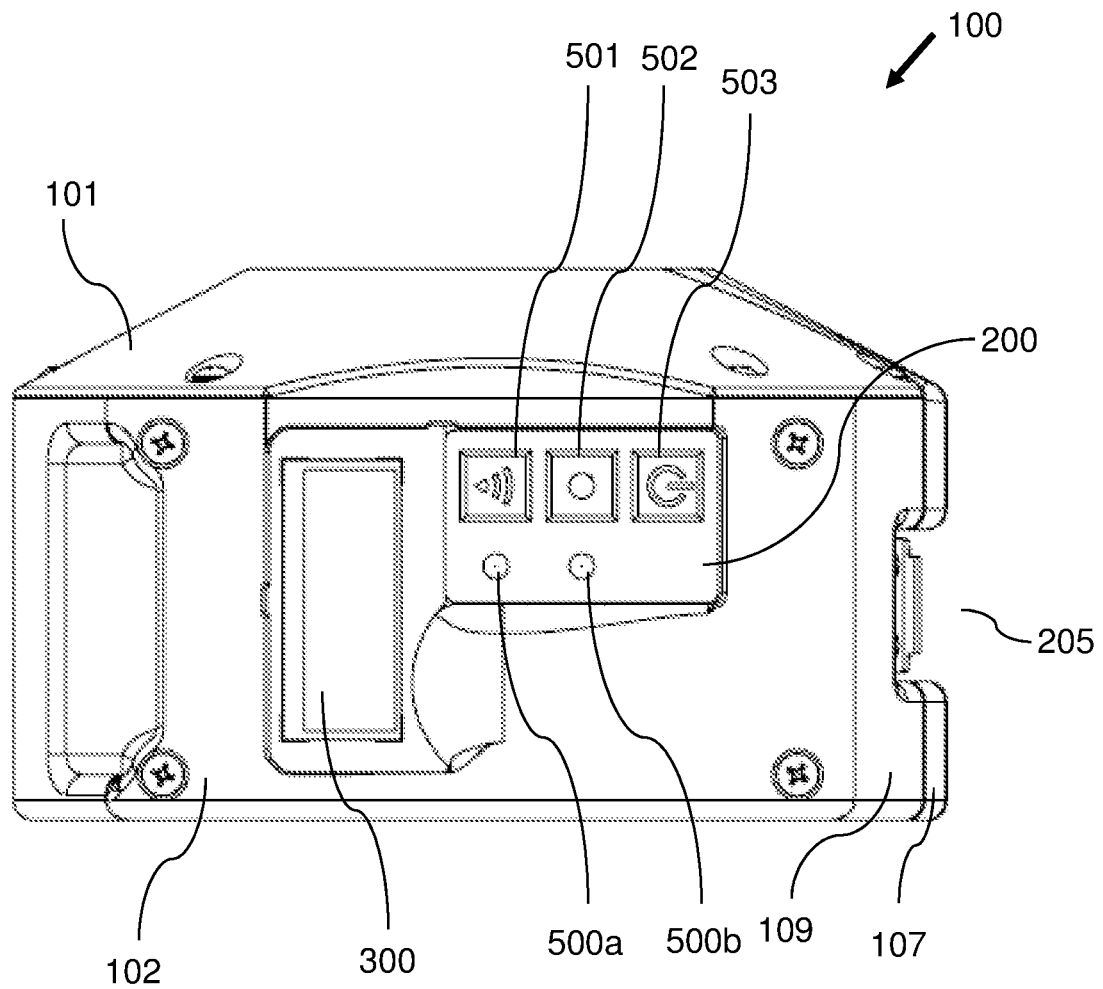
FIG. 5 depicts a top-down graphical representation of a diagnostic apparatus according to one or more aspects of the present disclosure.

FIG. 5 depicts a top-down graphical representation of a diagnostic apparatus according to one or more aspects of the present disclosure. As discussed above, the diagnostic camera apparatus 100 includes a main housing 101 and a camera housing 102. Camera housing 102 can include a membrane panel 200. Membrane panel 200 can include a plurality of operation buttons 301 and when operation buttons 301 are depressed they operate the camera assembly 201 and main housing 101. In another aspect, the operation buttons 301 can include a variety of operational function such as to toggling wireless communication on and off with a wireless button 501, initiating recording of video or image capture with a capture/record button 502, or toggling diagnostic camera apparatus 100 power on an off signal with a power on/off button 503. However, the operation buttons 301 are not limited to the previous examples and can also include a menu button, operation setting buttons, or a combination thereof.

In another aspect, membrane panel 200 can include a plurality of operation lights 500a-500b to signal to a user if diagnostic camera apparatus 100 is operating or not. Membrane panel 200 is not limited to only having operation lights 500a-500b. Operation lights 500a-500b can include a variety of operational function such as the operation light 500a can indicate whether diagnostic camera apparatus 100 is recording video or capturing images, the operation light 500b can indicate whether diagnostic camera apparatus 100 is powered on or off, or a combination of the operation light 500a and the operation light 500b can indicate an error has occurred during operation or the storage medium is at or near storage capacity. However, the operation lights 500a-500b are not limited to the previous examples and can also include diagnostic camera apparatus 100 malfunction, battery 208 is low in power, camera housing 102, battery access door 207, and battery assembly 212 are not properly secured to main housing 101, main housing door 107 fastener 205 is not properly secured to main housing body 109, or a combination thereof.

In another aspect, all the operation buttons 301 and operation light 500a-500b functions can also be displayed on display 213 of the camera assembly 201 through the display window 300 of the camera housing 102.

Figure 6:
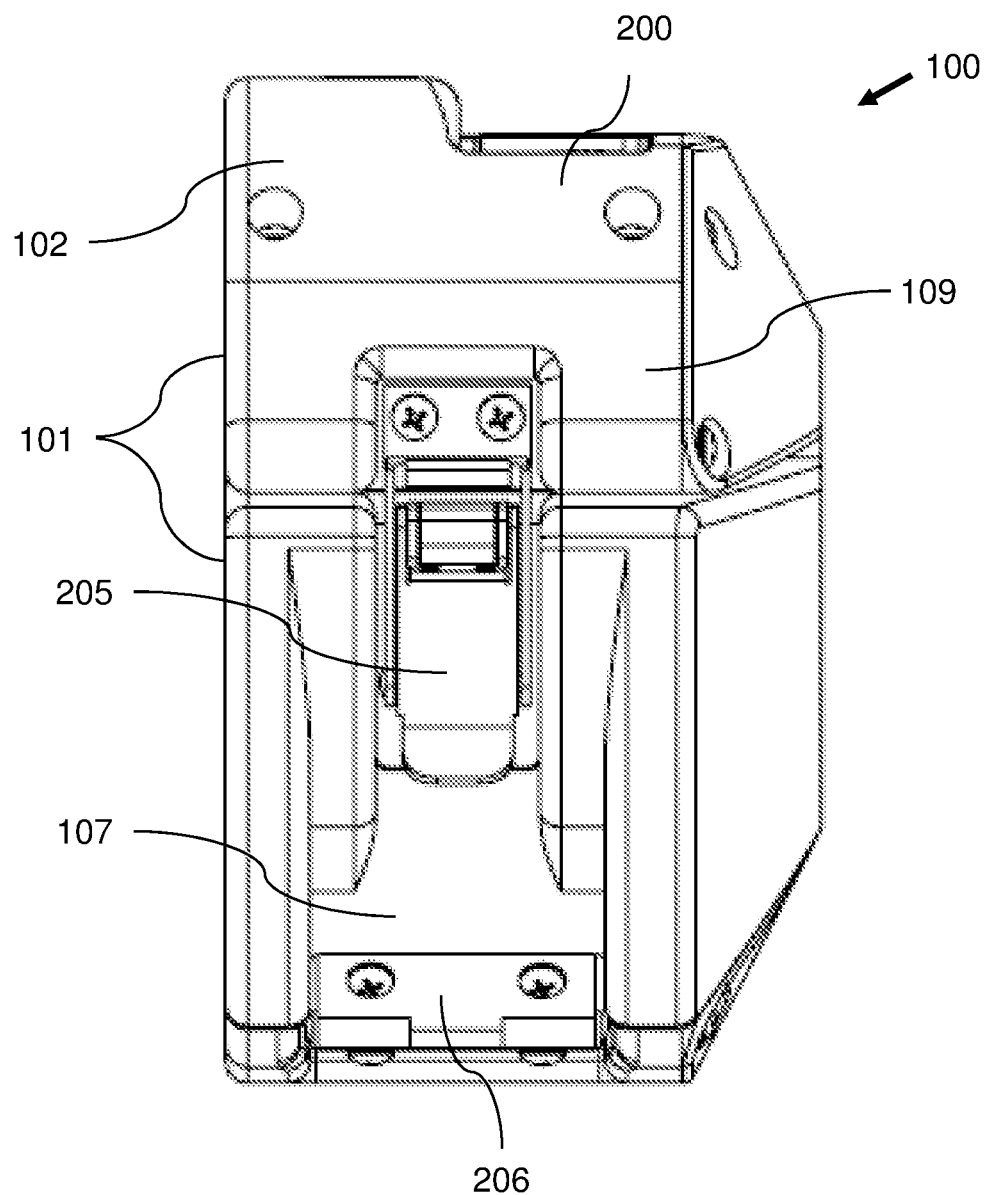
FIG. 6 depicts a side graphical representation of a diagnostic apparatus according to one or more aspects of the present disclosure.

FIG. 6 depicts a side graphical representation of a diagnostic apparatus according to one or more aspects of the present disclosure. As previously discussed, main housing 101 of diagnostic camera apparatus 100 includes main housing body 109 that is attached to main housing door 107 by a hinge 206. In another aspect, hinge 206 can also be a pivot joint. Hinge 206 allows for main housing body 109 to open or swing outwards away from the main housing door 107 to allow a moveable member 801 to be inserted into channel 105. After a moveable member 801 has been inserted into channel 105, main housing door 107 rotates closed by hinge 206 where main housing door 107 is resting against main housing body 109 again. Fastener 205 is attached to the main housing door 107 on the opposite side of the main housing door 107 from hinge 206. At this point, fastener 205 can be secured to main housing body 109 on the opposite side on the main housing body 109 from the hinge 206 with a receiving device to secure the main housing body 109 and main housing door 107 together. As a result, moveable member 801 is tightly secured against inner wall 110. Diagnostic camera apparatus 100 is now properly installed on a moveable member 801 of an enclosed tube system for diagnostic inspection. Upon completion of the diagnostic inspection, diagnostic camera apparatus 100 can be removed from moveable member 801 in a similar method as it was secured to the moveable member 801 for inspection.

Figure 7:
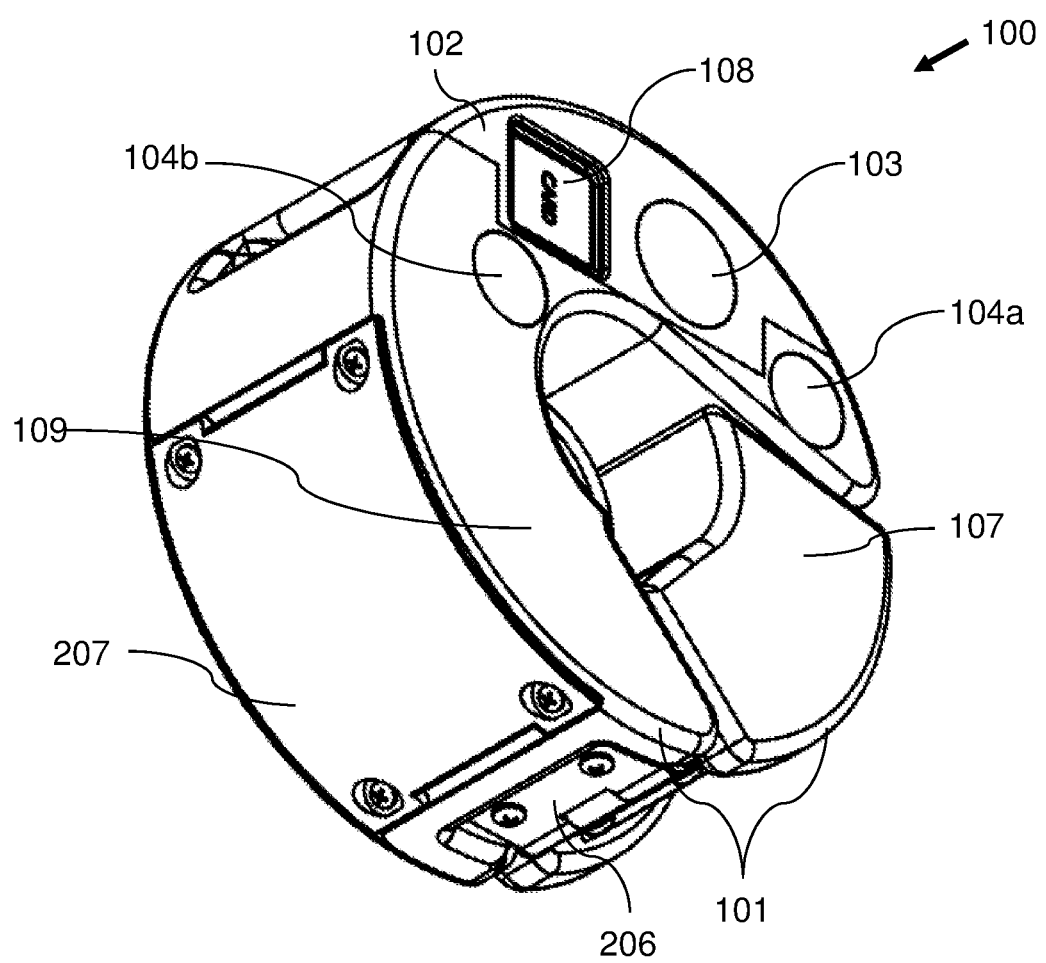
FIG. 7 depicts a perspective graphical representation of a diagnostic apparatus according to one or more aspects of the present disclosure.

FIG. 7 depicts a perspective graphical representation of a diagnostic apparatus according to one or more aspects of the present disclosure. As previously discussed, diagnostic camera apparatus 100 can also include a battery housing 211 integrated into main housing 101.

Battery housing 211 can be covered by battery access door 207. In one aspect, battery access door 207 closes over the cavity of the battery housing 211 of the main housing 101 to prevent contaminants or debris from entering the battery housing 211. In another aspect, battery access door 207 can be secured to main housing 101 by a hinge where the battery access door 207 can swing outward away from main housing 101. In another aspect, the hinge of battery access door 207 can be molded into the main housing 101 and battery access door 207 and joined by a pin. In another aspect, the hinge of battery access door 207 can slide open to access the battery 208. In one aspect, battery housing 211 can be detached from main housing 101 to be repaired or serviced. However, securing the battery access door to main housing 101 is not limited to the previous example.

Figure 8A:
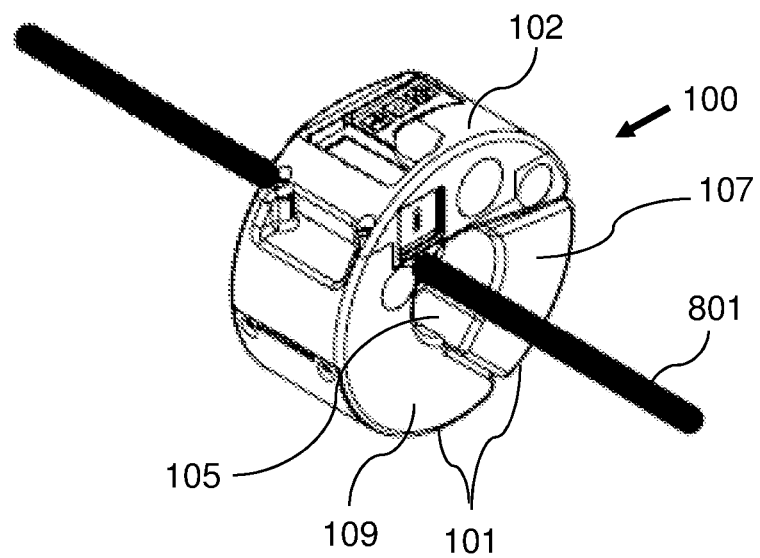
FIGS. 8A-8B depict a frontal and rear perspective graphical representation of a diagnostic apparatus attached to a moveable member according to one or more aspects of the present disclosure.
Figure 8B:
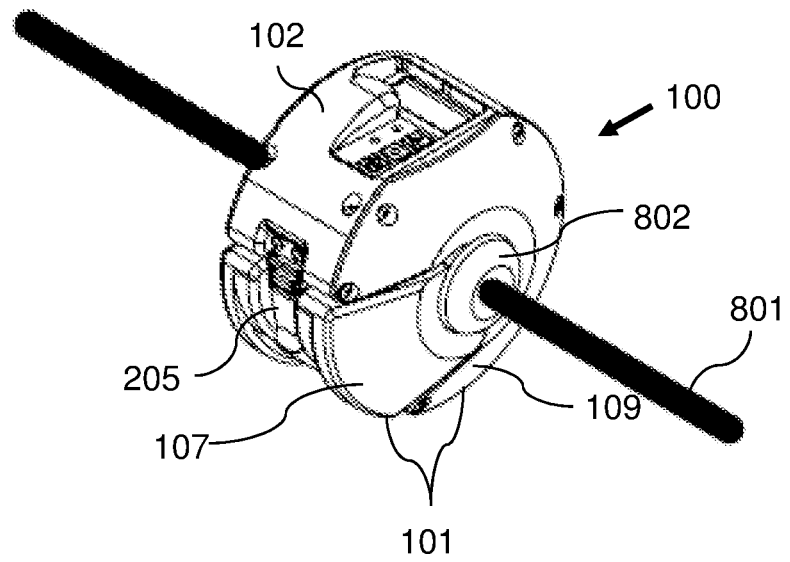

FIGS. 8A-8B depicts a frontal and rear perspective graphical representation of a diagnostic apparatus attached to a moveable member 801 according to one or more aspects of the present disclosure. As previously discussed, main housing 101 can include a main housing body 109 and main housing door 107.

Main housing 101 is a structure that can be secured around a moveable member 801 with main housing body 109 and main housing door 107 to form channel 105. Main housing door 107 can be opened to allow the moveable member 801 to be inserted into channel 105 of diagnostic camera apparatus 100. Main housing door 107 can then be closed around moveable member 801 to secure it in channel 105. Moveable member 801 can be secured against the inner wall 110 as main housing body 109 and main housing door 107 are enclosed around moveable member 801. In one aspect inner wall 110 can be of a structural design to secure the moveable member 801 tightly against the inner wall 110 to prevent moveable member 801 from slipping during operation. In another aspect, the inner wall 110 can be smooth material or rough material depending on how secure the diagnostic camera apparatus 100 needs to be secured to the moveable member 801. In one aspect, a moveable member 801 can be a cable, chain, rope, flexible device, or a combination thereof to travel through an enclosed tube system. In another aspect, a moveable member 801 can also be a coupler 802 or another device which is attached to a cable or chain to travel through an enclosed tube system. Also, main housing 101 will be secured to moveable member 801 in such a way to not rotate with respect to the moveable member 801.

Any methods and/or data of the present disclosure, such as the diagnostic apparatus or methods for inspection of an enclosed tube system to obtain images or video of the interior of the enclosed tube system while the diagnostic camera apparatus is attached to a moveable member and traveling through the enclosed tube system as discussed herein, may be stored on a computer-readable storage medium. A computer-readable and/or writable storage medium used commonly, such as, but not limited to, one or more of a hard disk (e.g., the hard disk, a magnetic disk, etc.), a flash memory, a CD, an optical disc (e.g., a compact disc ("CD") a digital versatile disc ("DVD"), a Blu-ray™ disc, etc.), a magneto-optical disk, a random-access memory ("RAM"), a DRAM, a read only memory ("ROM"), a storage of distributed computing systems, a memory card, or the like (e.g., other semiconductor memory, such as, but not limited to, a non-volatile memory card, a solid state drive, SRAM, etc.), an optional combination thereof, a server/database, etc. may be used to cause a processor, such as, the processor or CPU of the aforementioned computer to perform the steps of the methods disclosed herein. The computer-readable storage medium may be a non-transitory computer-readable medium, and/or the computer-readable medium may comprise all computer-readable media, with the sole exception being a transitory, propagating signal. The computer-readable storage medium may include media that store information for predetermined or limited or short period(s) of time and/or only in the presence of power, such as, but not limited to Random Access Memory (RAM), register memory, processor cache(s), etc. Embodiment(s) of the present disclosure may also be realized by a computer of a system or apparatus that reads out and executes computer executable instructions (e.g., one or more programs) recorded on a storage medium (which may also be referred to more fully as a "non-transitory computer-readable storage medium") to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s).

The above described devices, systems, and methods can be implemented by supplying one or more computer-readable media having stored therein computer-executable instructions for realizing the above described operations to one or more computer devices that are configured to read the computer-executable instructions and execute them. In this case, the system or devices perform the operations of the above-described embodiments when executing the computer-executable instructions. Also, an operating system on the one or more systems or devices may implement the operations of the above described embodiments. Thus, the computer-executable instructions or the one or more computer-readable media storing the computer-executable instructions or the one or more computer-readable media storing the computer-executable instructions thereon constitute an embodiment.

While this disclosure has been particularly shown and described with references to exemplary embodiments thereof, it will be understood by those skilled in the art that various changes in form and details may be made therein without departing from the scope of the claimed embodiments.

What is claimed is:

1. A diagnostic apparatus for inspecting an enclosed tube system having an enclosed tube and a moveable member moveable along the enclosed tube, comprising:
   a camera housing configured to include a camera assembly to capture an image of an interior of the enclosed tube system;
   a battery housing configured to hold a battery assembly; and
   a main housing configured to be detachably secured to the moveable member,
   wherein the camera housing and battery assembly are secured to the main housing such that, in a case the main housing is secured to the moveable member that is moving along the enclosed tube, the camera housing and the battery assembly are moving with the moveable member along the enclosed tube, and
   wherein the main housing includes at least one light.

2. The diagnostic apparatus of claim 1, wherein the main housing further comprises a main housing door that opens to allow the main housing to be placed on the moveable member and the main housing door to be closed to secure the main housing to the moveable member.

3. The diagnostic apparatus of claim 1, wherein the main housing further comprises a detector to interact with the moveable member when the main housing is secured around the moveable member.

4. The diagnostic apparatus of claim 1, wherein the camera housing and battery assembly are detachable from the main housing.

5. The diagnostic apparatus of claim 1, wherein the camera housing further comprises a display window to view a display of the camera assembly.

6. The diagnostic apparatus of claim 1, wherein the camera housing further comprises a membrane panel with a plurality of operation buttons and lights to provide a user interface,
   wherein in a case where any of the plurality of operation buttons are depressed they operate the camera assembly and main housing.

7. The diagnostic apparatus of claim 1, wherein the camera assembly captures images and stores the images on a storage medium, and
   wherein the storage medium is accessible through a storage medium access door of the camera housing.

8. The diagnostic apparatus of claim 1, further comprising a heat sink to remove heat from the camera assembly and main housing.

9. The diagnostic apparatus of claim 1, wherein the battery assembly comprises a battery and the battery assembly supplies power to the main housing and camera assembly.

10. The diagnostic apparatus of claim 1, wherein the camera assembly further comprises:
    a transceiver,
    wherein the transceiver transmit images to an external device, and
    wherein the transceiver receive instructions to control the camera assembly and main housing.

11. A method of diagnostic inspection of an enclosed tube system having an enclosed tube and a moveable member moveable along the enclosed tube, the method comprising:
    attaching a diagnostic apparatus to the moveable member of the enclosed tube system;
    moving the diagnostic apparatus through the enclosed tube system; and
    capturing images of an interior of the enclosed tube system, wherein the diagnostic apparatus comprises:
       a camera housing configured to include a camera assembly to capture an image of the interior of the enclosed tube system;
       a battery housing configured to hold a battery assembly; and
       a main housing configured to be detachably secured to the moveable member,
       wherein the camera housing and battery assembly are secured to the main housing such that, in a case the main housing is secured to the moveable member that is moving along the enclosed tube, the camera housing and the battery assembly are moving with the moveable member along the enclosed tube, and
       wherein the main housing includes at least one light.

12. The method of claim 11, wherein the main housing further comprises a main housing door that opens to allow the main housing to be placed on the moveable member and the main housing door to be closed to secure the main housing to the moveable member.

13. The method of claim 11, wherein the main housing further comprises a detector to interact with the moveable member when the main housing is secured around the moveable member.

14. The method of claim 11, wherein the camera housing and battery assembly are detachable from the main housing.

15. The method of claim 11, wherein the camera housing further comprises a display window to view a display of the camera assembly.

16. The method of claim 11, wherein the camera housing further comprises a membrane panel with a plurality of operation buttons and lights to provide a user interface,
   wherein in a case where any of the plurality of operation buttons are depressed they operate the camera assembly and main housing.

17. The method of claim 11, wherein the camera assembly captures images and stores the images on a storage medium, and
   wherein the storage medium is accessible through a storage medium access door of the camera housing.

18. The method of claim 11, further comprising a heat sink to remove heat from the camera assembly and main housing.

19. The method of claim 11, wherein the battery assembly comprises a battery and the battery assembly supplies power to the main housing and camera assembly.

20. The method of claim 11, wherein the camera assembly further comprises:
   a transceiver,
   wherein the transceiver transmit images to an external device, and
   wherein the transceiver receive instructions to control the camera assembly and main housing.

* * * * *